Oct. 8, 1957 M. L. MILLER 2,809,349
DEVICE FOR TESTING WIRE INSULATION
Filed Nov. 29, 1956
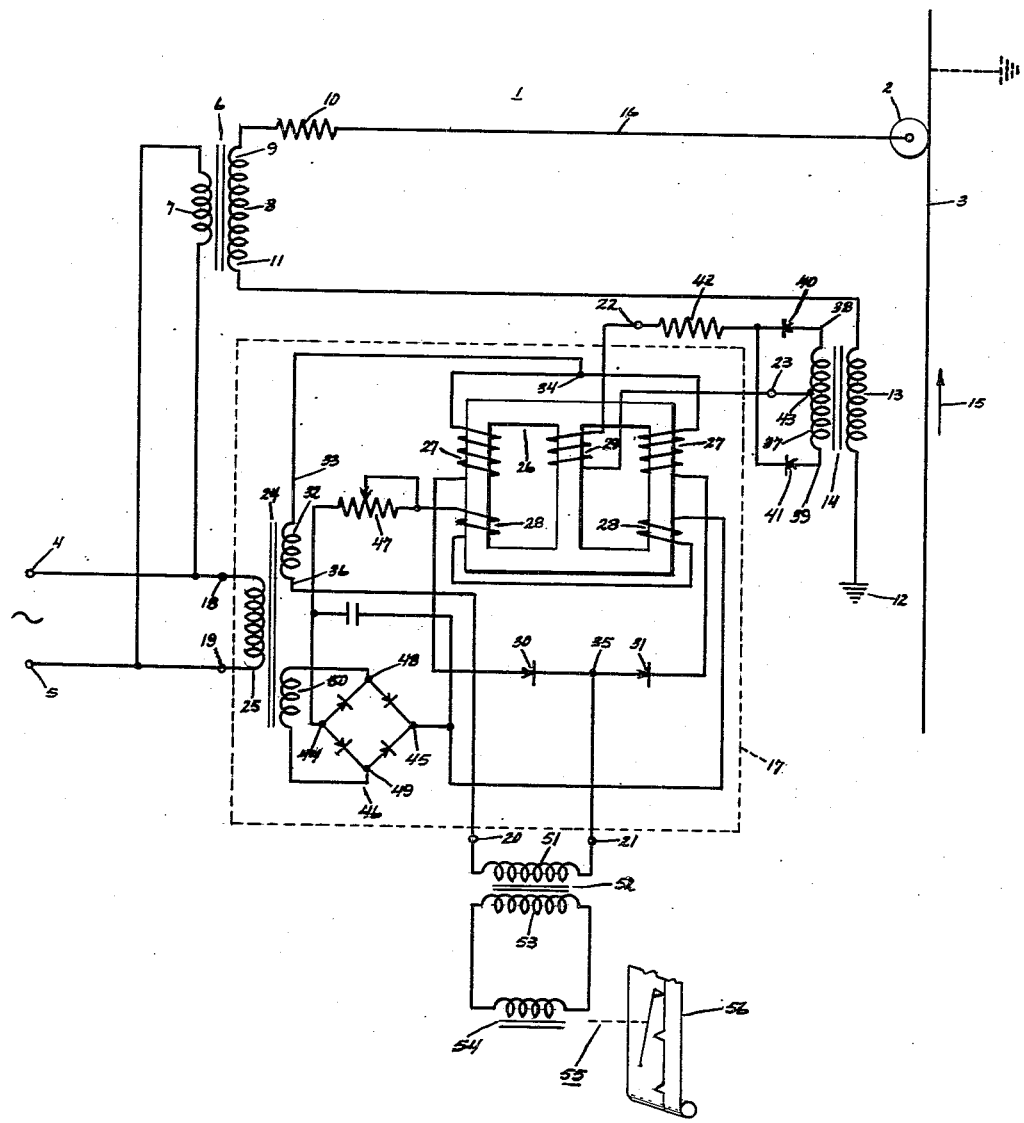
Inventor:
Meritt L. Miller,
by Robert G. Tris
His Attorney.

United States Patent Office 2,809,349
Patented Oct. 8, 1957

2,809,349

DEVICE FOR TESTING WIRE INSULATION

Meritt L. Miller, Fort Wayne, Ind., assignor to General Electric Company, a corporation of New York Application November 29, 1956, Serial No. 625,064

8 Claims. (Cl. 324—54)

This invention relates to devices for testing wire insulation to detect breaks therein and more particularly to devices for continuously testing the continuity of insulation on wire.

Wire having insulation formed of one or more coats of enamel is used in large quantity in the manufacture of electrical apparatus, such as dynamoelectric machines and transformers; such wire is conventionally referred to as magnet wire. It is difficult to manufacture magnet wire in quantity which does not have any breaks in the enamel coating, however, a predetermined number of breaks in the insulation for any given length of wire can be tolerated since when such wire is wound in coils, it is highly unlikely that breaks in the insulation will occur adjacent each other thereby causing a short circuit. Magnet wire manufacturers therefore may guarantee to their customers that particular lots of magnet wire have no more than a certain predetermined number of breaks per given unit of length generally 100 feet; this requires that there be available apparatus for continuously testing insulated wire to detect and record breaks in the insulation thereon so that the number of breaks per unit length will actually be known.

Various devices have been utilized in the past for continuously testing the insulation on wire, generally immediately after the enamel has been applied. For example, the wire has been passed through a mercury bath, the mercury being connected to a source of voltage and the conductor of the wire grounded through the enameling machinery, as is the other side of the source of voltage. Thus, when a break in insulation occurs, current flows through the conductor and the mercury, this current flow being sensed by conventional means to provide an indication and record of breaks in the insulation. While the mercury bath method provides satisfactory test results and has the advantage of requiring only a low voltage source, the mercury may be injurious to some types of insulation.

Other types of testing devices have also been utilized in which current is caused to flow in response to the sensing by a contact device riding on the wire of a break in the insulation, however, while these devices have proved satisfactory for larger wire sizes, it has been found in the case of smaller wire sizes, that the arc which may form at the break in the insulation may burn the wire in two; this then requires restringing the enameling machine which is an expensive and time consuming operation. Devices which have been proposed in the past for continuously testing insulated wire and which would eliminate this difficulty have been complex, expensive, and not sufficiently reliable; magnet wire enameling machines may operate continuously for more than a year at a time and thus the testing apparatus must also operate continuously for the same period.

It is therefore desirable to provide a device for continuously testing the insulation on wire to detect and record breaks therein which will provide an adequate signal to actuate the indicating and recording apparatus and yet not draw currents sufficient to damage the wire or in any other way be injurious to the wire or its insulation. Such a device must therefore provide amplification of the signal indicating the break, and must at the same time be shock-resistant and provide completely reliable results without maintenance for long periods of time. The device must also be simple and relatively inexpensive since large numbers of insulation testing devices are used in a magnet wire mill. Magnetic amplifiers have the ability to amplify relatively small signals, are simple, and provide completely reliable, maintenance-free operation. It is therefore desirable to provide a testing device of the type hereunder consideration which utilizes a magnetic amplifier to energize the indicating and recording apparatus in response to an insulation break-sensing signal.

It is accordingly an object of this invention to provide an improved device for continuously testing insulated wire to detect breaks in the continuity of the insulation thereon.

Another object of this invention is to provide a simple device for continuously testing insulated wire to detect breaks in the continuity of the insulation which provides an adequate signal for actuating indicating and recording apparatus and which also provides completely reliable, maintenance-free operation.

Yet another object of this invention is to provide an improved device for continuously testing insulated wire to detect breaks in the continuity of the insulation utilizing a magnetic amplifier for energizing the indicating and recording apparatus in response to an insulation break-indicating signal.

Further objects and advantages of this invention will become apparent and the invention will be better understood by reference to the following description and the accompanying drawing, and the features of novelty which characterize this invention will be pointed out with particularity in the claims annexed to and forming a part of this specification.

This invention in its broader aspects provides a device for continuously testing insulated wire to detect breaks in the continuity of insulation thereon having contact means arranged continuously to contact the wire for sensing a break in the insulation. A magnetic amplifier is provided having an alternating current input circuit, a signal circuit, and an output circuit. A source of voltage is connected in circuit between the contact means and the signal circuit of the magnetic amplifier and circuit connections are provided for in turn connecting the signal circuit to the conductor of the wire so that the source of voltage causes current flow through the contact means, the wire and the signal circuit, when there is a break in the insulation adjacent the contact means. The magnetic amplifier is arranged to provide a change in its output voltage in response to the current flow in the signal circuit and indicating means are provided connecting to the output and arranged to provide a positive indication in response to the change in output voltage thereby to indicate a break in the wire insulation.

The single figure of the drawing is a schematic diagram illustrating the preferred embodiment of the improved wire insulation testing device of this invention.

Referring now to the drawing, the improved insulation testing device 1 of this invention includes a wire contacting device 2, preferably a wheel riding on the insulated wire 3 and further preferably formed of semi-conducting material such as neoprene or carbon. The conductor of the insulated wire 3 is grounded through the insulating and winding apparatus (not shown). A pair of alternating current input terminals 4 and 5 are provided adapted to be connected to an external source of single phase alternating current (not shown) and a transformer 6 is provided having its primary winding 7 connected across input terminals 4 and 5. Transformer 6 has a high voltage secondary winding 8 which has one end 9 connected to contact wheel 2 by conductor 16 through a series current limiting resistor 10. The other end 11 of secondary winding 8 of transformer 6 is connected to ground, as at 12, through primary winding 13 of transformer 14.

It will now be seen that the high voltage provided by secondary winding 8 of transformer 6 is applied to semiconducting contact wheel 2 which in turn establishes an ionized space around the portion of insulated wire 3 adjacent wheel 2. Wire 3 may be assumed to be moving in the direction shown by the arrow 15 from the enameling apparatus (not shown) to the spooling apparatus (also not shown) and if a break in the insulation coating on the conductor passes the contact wheel 2, a small current will flow through the ionized space, through conductor 16, current limiting resistor 10, secondary winding 8, primary winding 13 of transformer 14, ground 12 and then back to the conductor of wire 3 by virtue of its grounded connection. Current limiting resistor 10 tends to limit this current to a safe value to prevent the arc formed in the ionized space by virtue of the break in the insulation from burning the wire in two or from increasing the size of the insulation discontinuity.

In order to actuate suitable indicating and recording apparatus in response to the current flow resulting from a break in the insulation on the wire 3, a magnetic amplifier 17 is provided having an input circuit terminating in input terminals 18 and 19, an output circuit terminating in output terminals 20 and 21, and a signal circuit terminating in terminals 22 and 23. Magnetic amplifier 17 includes a core 26 formed of suitable saturable magnetic material on which alternating current gate windings 27, direct current bias windings 28 and signal winding 29 are arranged. Alternating gate windings 27 are connected in a closed loop with half-wave rectifiers 30 and 31 connected in series therewith and similarly polarized. Transformer 24 has a secondary winding 32 having one end 33 connected to the midpoint 34 between gate windings 27. The midpoint 35 between half-wave rectifiers 30 and 31 is connected to one output terminal 21 which the other output terminal 20 is connected to the other end 36 of secondary winding 32 of transformer 24. Signal winding 29 is connected to terminals 22 and 23 and transformer 14 has a secondary winding 37 with its ends 38 and 39 connected together through oppositely polarized half-wave rectifiers 40 and 41. Rectifier 40 is serially connected with signal terminal 22 through current limiting resistor 42 while center tap 43 of secondary winding 37 of transformer 14 is connected to the other signal terminal 23. It will readily be seen that the arrangement of the center-tapped secondary winding 37 and half-wave rectifiers 40 and 41 constitutes a full-wave center-tap rectifying circuit for energizing signal winding 29 with rectified direct current in response to the current flowing through primary winding 13 of transformer 14, which in turn is in response to a break in the insulation on wire 3. Direct current bias windings 28 are serially connected across output corners 44 and 45 of bridge rectifier 46 with potentiometer 47 being connected in series therewith for adjusting the bias voltage applied to the bias windings 28. The input corners 48 and 49 are connected across secondary winding 50 of transformer 24.

Output terminals 20 and 21 of magnetic amplifier 17 are connected to primary winding 51 of output transformer 52, which has its secondary winding 53 connected to energize operating coil 54 of recorder 55, which in turn provides a continuous indication on tape 56 of the breaks in the insulation of wire 3.

It will be seen that magnetic amplifier 17 provides an alternating current output, with current flowing during one half cycle from end 33 of secondary winding 32 to point 34, one gate winding 27, half-wave rectifier 30, output terminal 21, primary winding 51 of transformer 52, output terminal 20 and back to the other end 36 of secondary winding 32. During the next half cycle, current flows from end 36 of secondary winding 32 to output terminal 20, primary winding 51 of transformer 52, output terminal 21, half-wave rectifier 31, the other gate winding 27, and point 34 back to the other end 33 of secondary winding 32. The operation of this type of magnetic amplifier having an alternating current output is more fully described in the United States Patent 2,126,790 to F. G. Logan and therefore will not be recited in detail here, it being sufficient to state that with no signal applied to winding 29, and with bias windings 28 respectively bucking gate windings 27, and thus resetting the bias or flux density level of the core after each respective half cycle, the normal half wave rectified load current flowing through the gate windings 27 during respective half cycles is insufficient to saturate the core 26 and thus gate windings 27 have high reactance so that minimum load current flows. When, however, a signal is applied to signal winding 29 in response to insulation break-indicating current flowing through primary winding 13 of transformer 14, signal winding 29 bucks the effect of bias windings 28 thereby permitting the currents flowing in gate windings 27 to saturate the core 26 so that gate windings 27 have their reactance substantially lowered thereby permitting a greatly increased flow of current through the load, in this case primary winding 51 of transformer 52, which in turn sufficiently energizes coil 54 of recorder 55 to provide an indication of the break in the insulation on wire 3.

While the above device has been described in particular connection with the detection of breaks in the enamel insulation coating on magnet wire, it will be readily apparent that it is equally applicable to other types of wire, for example, rubber covered wire. Furthermore, while contact device 2 has been shown as a wheel, it is readily apparent that other types of contact devices, such as a contact shoe may be utilized. In addition, while a semi-conducting contact device is preferred, it will be understood that one or more contact devices formed of conducting material may be utilized. Furthermore, if this device is utilized for detecting breaks in the insulation of any individual wire forming a cable, such means as a salt bath may be substituted for the semiconducting wheel 2 riding on the signal wire 3. It will also be readily apparent that other well-known magnetic amplifier circuits may be utilized rather than the alternating current output circuit shown in the drawing, for example, a magnetic amplifier having a direct current output may be utilized with the output circuit being directly connected to the operating coil of the recorder thereby eliminating the output transformer 52. The indicating or recording device 55 is illustrated merely schematically since it will be understood that this is a commercially available device which does not form a part of this invention, other than in combination with the other elements of the circuit.

It will now be readily apparent that this invention provides an improved device for testing insulated wire to detect breaks in the continuity of the insulation thereon, the device having simple, static components and providing an adequate signal for actuating indicating and recording apparatus with a minimum insulation break-sensing signal which will not damage the wire.

A device incorporated in the above described circuit has been constructed and used for testing magnetic wire having a .008 through .1285 inch diameter conductor and .0005 through .007 inch thickness enamel coating. A neoprene wheel was used as conductive device 2 with secondary winding 8 of transformer 6 having 800 volts output and with input terminals 4 and 5 connected across a source of 118 volt, 60 cycle alternating current. Current flow through primary winding 13 of transformer 14 in response to a break in insulation of wire 3 was on the order of 120 microamperes while the output voltage provided across terminals 20 and 21 was 25 volts with the signal applied to signal winding 29, in contrast with 5 volts with no signal applied. Secondary winding 32 of transformer 24 provided 40 volts while bias current in winding 28 was 4.0 milliamperes.

While I have shown and described a specific embodiment of this invention, further modifications and improvements would occur to those skilled in the art. I desire that it be understood therefore that this invention is not limited to the specific form shown and I intend in the appended claims to cover all modifications which do not depart from the spirit and scope of this invention.

What I claim as new and desire to secure by Letters Patent of the United States is:

1. A device for continuously testing insulated wire to detect breaks in the continuity of the insulation thereon, said device comprising contact means adapted continuously to contact said wire for sensing a break in said insulation; a magnetic amplifier having an alternating current input circuit, a signal circuit, and an output circuit; a source of voltage connected in circuit between said contact means and said signal circuit, circuit connections for connecting said signal circuit to the conductor of said wire whereby said voltage source causes current to flow through said signal circuit when a break in said insulation is adjacent said contact means, said magnetic amplifier being arranged to provide a change in output voltage in response to said current flow in said signal circuit, and indicating means connected to said output circuit and arranged to provide a positive indication in response to said change in output voltage thereby to indicate a break in said wire insulation.

2. A device for continuously testing insulated wire to detect breaks in the continuity of the insulation thereon, said device comprising contact means adapted continuously to contact said wire for sensing a break in said insulation; a magnetic amplifier having an alternating current input circuit, a signal circuit, and an output circuit; a source of voltage connected in circuit between said contact means and said signal circuit, circuit connections for connecting said signal circuit to the conductor of said wire whereby said voltage source causes current to flow through said signal circuit when a break in said insulation is adjacent said contact means, impedance means in series with said voltage source for limiting said current flow, said magnetic amplifier being arranged to provide a change in output voltage in response to said current flow in said signal circuit, and indicating means connected to said output circuit and arranged to provide a positive indication in response to said change in output voltage thereby to indicate a break in said wire insulation.

3. A device for continuously testing insulated wire to detect breaks in the continuity of the insulation thereon, said device comprising contact means formed of semiconducting material adapted continuously to contact said wire for sensing a break in said insulation, a pair of alternating current input terminals; a magnetic amplifier having an input circuit connected in circuit with said input terminals, a signal circuit, and an output circuit; a transformer having a primary winding connected across said input terminals and a high voltage secondary winding connected in series between said contact means and said signal circuit, circuit connections for connecting said signal circuit to the conductor of said wire whereby the voltage provided by said secondary winding causes current to flow through said signal circuit when a break in said insulation is adjacent said contact means, said magnetic amplifier being arranged to provide a change in output voltage in response to said current flow in said signal circuit, and indicating means connected to said output circuit and arranged to provide voltage thereby to indicate a break in said wire insulation.

4. A device for continuously testing insulated wire to detect breaks in the continuity of the insulation thereon, said device comprising contact means adapted continuously to contact said wire for sensing a break in said insulation; a magnetic amplifier having a saturable magnetic core, a pair of gate windings on said core connected in a closed loop with a pair of similarly polarized half wave rectifiers, a pair of alternating current input terminals and a pair of alternating current output terminals, said loop being connected in circuit with said input and output terminals to provide an alternating current output voltage across said output terminals, a direct current signal winding on said core, direct current bias winding means on said core, a source of alternating current voltage connected in circuit with said contact means, circuit connections for connecting said voltage source to the conductor of said wire whereby current flows through said circuit connections when a break in insulation is adjacent said contact means, means responsive to said current flow for energizing said signal winding, said bias winding means being arranged to provide increased output voltage in response to said energization of said signal winding, and indicating means connected to said output terminals arranged to provide a positive indication in response to said increased output voltage thereby to indicate a break in said wire insulation.

5. A device for continuously testing insulated wire to detect breaks in the continuity of the insulation thereon, said device comprising contact means formed of semiconducting material adapted continuously to contact said wire for sensing a break in said insulation, a magnetic amplifier having a saturable magnetic core, a pair of gate windings on said core connected in a closed loop with a pair of similarly polarized half wave rectifiers, a pair of alternating current input terminals and a pair of alternating current output terminals, said loop being connected in circuit with said input and output terminals to provide an alternating current output voltage across said output terminals, a direct current signal winding on said core, direct current bias winding means on said core, a transformer having a primary winding connected across said input terminals and a high voltage secondary winding, circuit connections for connecting said secondary winding in series between said contact means and the conductor of said wire whereby current flows through said circuit connections when a break in said insulation is adjacent said contact means, means responsive to said current flow for energizing said signal winding, said bias winding means being arranged to provide an increased output voltage in response to said energization of said signal winding, and indicating means connected to said output terminals arranged to provide a positive indication in response to said increased output voltage thereby to indicate a break in said wire insulation.

6. A device for continuously testing insulated wire to detect breaks in the continuity of the insulation thereon, said device comprising contact means adapted continuously to contact said wire for sensing a break in said insulation; a magnetic amplifier having a saturable magnetic core, a pair of gate windings on said core connected in a closed loop with a pair of similarly polarized half wave rectifiers, a pair of alternating current input terminals and a pair of alternating current output terminals, said loop being connected in circuit with said input and output terminals to provide an alternating current output voltage across said output terminals, a direct current signal winding on said core, direct current bias winding means on said core, a source of alternating current voltage connected in circuit with said contact means, circuit connections for connecting said voltage source to the conductor of said wire whereby current flows through said circuit connections when a break in insulation is adjacent said contact means, a transformer having its primary winding connected in series with said voltage source, rectifying means connected in circuit between the secondary winding of said transformer and said signal winding for energizing said signal winding in response to said current flow, said bias winding means being arranged to provide an increased output voltage in response to said energization of said signal winding, and indicating means connected to said output terminals arranged to provide a positive indication in response to said increased output voltage thereby to indicate a break in said wire insulation.

7. A device for continuously testing insulated wire to detect breaks in the continuity of the insulation thereon, said device comprising contact means adapted continuously to contact said wire for sensing a break in said insulation, a magnetic amplifier having a saturable magnetic core, a pair of gate windings on said core, a pair of alternating current input terminals and a pair of output terminals, rectifying means connected in circuit with said input and output terminals and said gate windings thereby to provide an output voltage across said output terminals, a direct current signal winding on said core, direct current bias winding means on said core, a source of alternating current voltage connected in circuit with said contact means, circuit connections for connecting said voltage source to the conductor of said wire whereby current flows through said circuit connections when a break in insulation is adjacent said contact means, means responsive to said current flow for energizing said signal winding, said bias winding means being arranged to provide an increased output voltage in response to said energization of said signal winding, and indicating means connected to said output terminals arranged to provide a positive indication in response to said increased output voltage thereby to indicate a break in said wire insulation.

8. A device for continuously testing insulated wire to detect breaks in the continuity of the insulation thereon, said device comprising contact means formed of semi-conducting material adapted continuously to contact said wire for sensing a break in said insulation, a magnetic amplifier having a saturable core, a pair of gate windings on said core connected in a closed loop with a pair of similarly polarized half-wave rectifiers, a pair of alternating current input terminals, a transformer having its primary winding connected across said input terminals and having first and second secondary windings, a pair of alternating current output terminals, said loop being connected in circuit with said output terminals and one of said secondary windings thereby providing an alternating current output voltage across said output terminals, a direct current signal winding on said core, direct current bias winding means on said core, full wave rectifying means connecting the other said secondary windings and said bias winding means for energizing the same, another transformer having a primary winding connected across said input terminals and having a high voltage secondary winding, circuit connections for connecting said high voltage secondary winding in series between said contact means and the conductor of said wire whereby current flows through said circuit connections when a break in said insulation is adjacent said contact means, a third transformer having its primary winding connected in series with said high voltage secondary winding, full wave rectifier means connected between the secondary winding of said last-named transformer and said signal winding for energizing the same in response to said current flow, impedance means connected in series with said high voltage secondary winding for limiting said current flow, said bias winding means being arranged to provide an increased output voltage in response to said energization of said signal winding, and indicating means connected to said output terminals arranged to provide a positive indication in response to said increased output voltage thereby to indicate a break in said wire insulation.

References Cited in the file of this patent
UNITED STATES PATENTS

| | | |
|---|---|---|
| 2,304,513 | Stearns | Dec. 8, 1942 |
| 2,568,172 | Spencer | Sept. 18, 1951 |
| 2,700,125 | King et al. | Jan. 18, 1955 |
| 2,719,288 | Young | Sept. 27, 1955 |
| 2,798,170 | Carlisle | July 2, 1957 |